(12) United States Patent
Lesellier

(10) Patent No.: US 7,593,592 B2
(45) Date of Patent: Sep. 22, 2009

(54) METHOD OF DETECTING BLOCKING ARTIFACTS

(75) Inventor: Estelle Lesellier, Boulogne (FR)

(73) Assignee: Koninklijke Philips Electronics N.V., Eindhoven (NL)

( * ) Notice: Subject to any disclaimer, the term of this patent is extended or adjusted under 35 U.S.C. 154(b) by 646 days.

(21) Appl. No.: 10/518,253

(22) PCT Filed: Jun. 16, 2003

(86) PCT No.: PCT/IB03/02778

§ 371 (c)(1),
(2), (4) Date: Dec. 16, 2004

(87) PCT Pub. No.: WO04/002163

PCT Pub. Date: Dec. 31, 2003

(65) Prior Publication Data

US 2006/0078155 A1  Apr. 13, 2006

(30) Foreign Application Priority Data

Jun. 25, 2002  (FR) .................................. 02 07862

(51) Int. Cl.
*G06K 9/40* (2006.01)

(52) U.S. Cl. .................. 382/275; 382/263; 382/268

(58) Field of Classification Search ......... 382/260–275, 382/100; 725/6; 375/E7.19–1.93
See application file for complete search history.

(56) References Cited

U.S. PATENT DOCUMENTS

| | | | | |
|---|---|---|---|---|
| 5,422,964 A * | 6/1995 | Devimeux et al. | ........ | 382/226 |
| 5,590,064 A * | 12/1996 | Astle | ............ | 708/203 |
| 5,974,193 A * | 10/1999 | Baudouin | ........ | 382/261 |
| 6,115,503 A * | 9/2000 | Kaup | ............ | 382/268 |
| 6,172,770 B1 * | 1/2001 | Inoue | ........ | 358/3.06 |
| 6,259,823 B1 * | 7/2001 | Lee et al. | ........ | 382/268 |
| 6,285,801 B1 * | 9/2001 | Mancuso et al. | ........ | 382/268 |
| 6,535,639 B1 * | 3/2003 | Uchihachi et al. | ........ | 382/225 |
| 6,539,060 B1 * | 3/2003 | Lee et al. | ........ | 375/240.29 |
| 6,546,132 B1 * | 4/2003 | Bhattacharjya et al. | ..... | 382/167 |
| 6,631,162 B1 * | 10/2003 | Lee et al. | ........ | 375/240.16 |
| 6,795,588 B1 * | 9/2004 | Nio et al. | ........ | 382/261 |

(Continued)

FOREIGN PATENT DOCUMENTS

EP  1223763 A1  7/2002

(Continued)

OTHER PUBLICATIONS

Wong et al. "Fast Motion Estimation for Video Resolution Down-Conversion Using Spatial Variant Filter(s)", Jul. 1999. IEEE Circuits and Systems, ISCAS '99, Proceedings for the 1999 IEEE International Symposium, vol. 4, pp. 528-531.*

(Continued)

*Primary Examiner*—Andrew W Johns
*Assistant Examiner*—Mia M Thomas

(57) ABSTRACT

Blocking artifacts within a sequence of digital images are detected by detecting a grid corresponding to the blocking artifacts. A portion of a digital image is high-pass filtered to supply a set of discontinuity pixels. Blocking artifacts are detected in the set, and rows within the portion are searched for a grid row having a density of blocking artifacts that is substantially larger than that of its neighboring rows.

16 Claims, 3 Drawing Sheets

U.S. PATENT DOCUMENTS

| | | | | |
|---|---|---|---|---|
| 6,822,675 | B2 * | 11/2004 | Jung et al. | 348/180 |
| 6,845,180 | B2 * | 1/2005 | Matthews | 382/268 |
| 6,859,558 | B2 * | 2/2005 | Hong | 382/236 |
| 6,920,252 | B2 * | 7/2005 | Rouvellou | 382/275 |
| 6,950,473 | B2 * | 9/2005 | Kim et al. | 375/240.29 |
| 6,990,252 | B2 * | 1/2006 | Shekter | 382/276 |
| 6,993,191 | B2 * | 1/2006 | Petrescu | 382/205 |
| 7,003,174 | B2 * | 2/2006 | Kryukov et al. | 382/266 |
| 7,031,392 | B2 * | 4/2006 | Kim et al. | 375/240.27 |
| 7,043,092 | B1 * | 5/2006 | Groliere | 382/268 |
| 7,050,618 | B2 * | 5/2006 | Belykh et al. | 382/132 |
| 7,075,993 | B2 * | 7/2006 | O'Brien, Jr. | 375/240.27 |
| 7,162,099 | B2 * | 1/2007 | Ojo et al. | 382/261 |
| 7,174,038 | B2 * | 2/2007 | Belykh et al. | 382/132 |
| 2005/0100235 | A1 * | 5/2005 | Kong et al. | 382/261 |
| 2007/0071356 | A1 * | 3/2007 | Caviedes et al. | 382/268 |

FOREIGN PATENT DOCUMENTS

| | | |
|---|---|---|
| WO | WO 01/20912 A1 * | 3/2001 |
| WO | WO0120912 A1 | 3/2001 |

OTHER PUBLICATIONS

Marc Antonini, et al; Image Coding Using Wavelet Transform; Transactions on Image Processing, vol. 1 No. 2, Apr. 1992, pp. 205-220 IEEE.

Lesellier E. et al; Robust Wavelet-Based Arbitrary Grid Detection for MPEG; vol. 2, Sep. 2002, pp. 417-420 IEEE.

* cited by examiner

METHOD OF DETECTING BLOCKING ARTIFACTS

The invention relates to a method of processing data corresponding to pixels of a sequence of digital images so as to detect a grid corresponding to blocking artefacts, said method comprising a step of high-pass filtering a portion of a digital image, intended to supply at least one card of discontinuity pixels, and a step of detecting blocking artefacts from the at least one card of discontinuity pixels.

The invention also relates to a television receiver comprising a processing device implementing the data processing method according to the invention.

It notably finds its application in the detection of blocking artefacts within a digital image which has been previously encoded and then decoded in accordance with a block-based encoding technique, for example, the MPEG standard ("Motion Pictures Expert Group"), and in the correction of data comprised in these blocks in order to attenuate the visual artefacts caused by the block-based encoding technique.

The blocking artefacts constitute a crucial problem for the block-based encoding techniques using a discrete transform of the discrete cosine transform DCT type. They appear in the form of block mosaics which are sometimes extremely visible in the decoded image sequences. These artefacts are due to a strong quantization subsequent to the discrete transform, which strong quantization causes strong discontinuities to appear at the borders of the encoding blocks.

International patent application WO 01/20912 describes a method with which a grid corresponding to blocking artefacts within a decoded digital image can be detected and localized. This method authorizes the detection of three regular grid sizes of 8×8, 10×8 and 12×8 pixels, which grid sizes result from principal formats of images used for broadcasting televised digital programs. The grid 8×8 corresponds to an image sequence encoded in a format of 576 rows of 720 pixels, the grid 10-11-11×8, approximate to a grid of 10×8, corresponds to an encoding in a 576×540 format, referred to as encoding format 3/4, and a grid 12×8 corresponds to an encoding in a 576×480 format, referred to as encoding format 2/3. The size of the grid is obtained by searching the most frequent distances between the blocking artefacts. The offset of the grid with respect to the origin (0,0) of the image is obtained by searching, among all possible offsets, the offset which corresponds to the presence of the largest number of blocking artefacts.

It is an object of the present invention to propose a data processing method which is more efficient.

The prior-art method is based on the search and the detection of blocking artefacts which are regularly spaced apart. Thus it searches only one size of the grid within an image and one offset of the grid with respect to the origin of said image. However, the grid may be distorted within the image because of a resampling of the image. This distortion may sometimes be known in advance, as in the case of the 3/4 encoding format, where the width of the grid varies in accordance with the 10-11-11 pattern. However, this variation is mostly arbitrary because it originates, for example, from a rate transcoding, an image format conversion in a 16/9 television receiver, from a 4/3 format into, for example, a 16/9 format, a zoom in a portion of the image, an A/D conversion, or even a combination of these different conversions. In this case, the prior art method retains the grid having the most frequent size and position and applies a post-processing step based on this grid, with a risk of a partial or even inefficient correction.

To cope with these problems, the data processing method according to the invention is characterized in that it comprises a step of searching, within the portion of the image, a set of grid rows, a grid row having a density of blocking artefacts which is substantially larger than that of its neighboring rows.

The processing method according to the invention is based on an analysis and partitioning of the blocking artefacts per row of an image and not on a search of the periodicity of the distances between the blocking artefacts, as in the prior-art technique. The result is a set of grid rows, in which the distance between the grid rows may be variable due to a resampling of the image, and not a grid having a mesh of fixed size. The processing method according to the invention thus provides the possibility of processing resampled images without a priori knowing the possible resampling operations.

Moreover, the risk of false detections is reduced as the selection of the blocking artefacts is made row by row, in contrast to the prior-art method in which the selection is made segment by segment, which considerably improves the efficiency of the method.

These and other aspects of the invention are apparent from and will be elucidated, by way of non-limitative example, with reference to the embodiment(s) described hereinafter.

Figure 3:
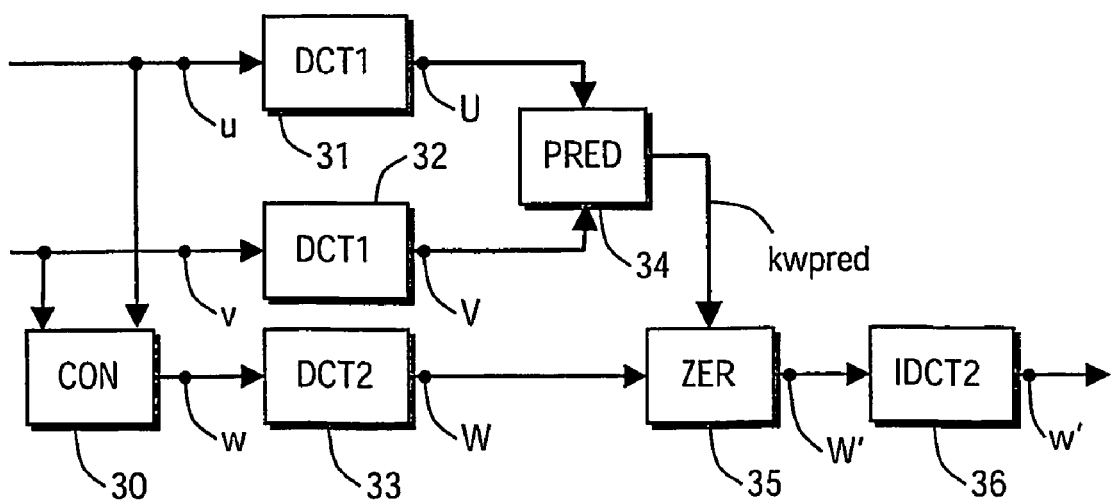

FIG. 3 describes a method of correcting blocking artefacts; and

Figure 4:
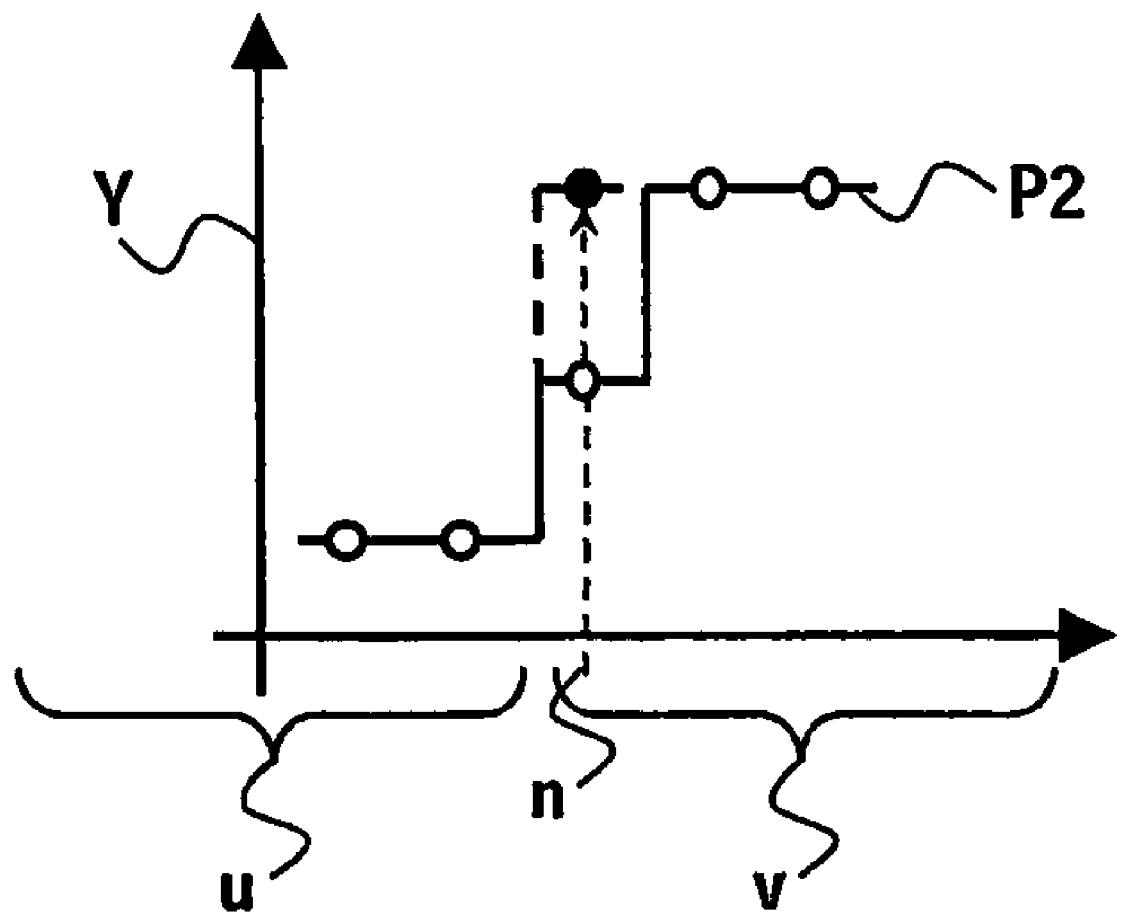

FIG. 4 describes the principle of correcting a blocking artefact of the type p2.

The invention relates to a method of processing a sequence of digital images encoded and decoded in accordance with a block-based encoding technique. In our example, the encoding technique used is the MPEG standard based on the discrete cosine transform DCT, but may alternatively be any other equivalent standard, such as, for example, the H.263 or H.26L standard. It should be noted that this method may also be applied to a fixed image, encoded, for example, in accordance with the JPEG standard. The processing method first relates to the detection of blocking artefacts due to these block-based encoding techniques and subsequently to the ensuing application such as, for example, post-processing techniques or image quality measurements.

Figure 1:
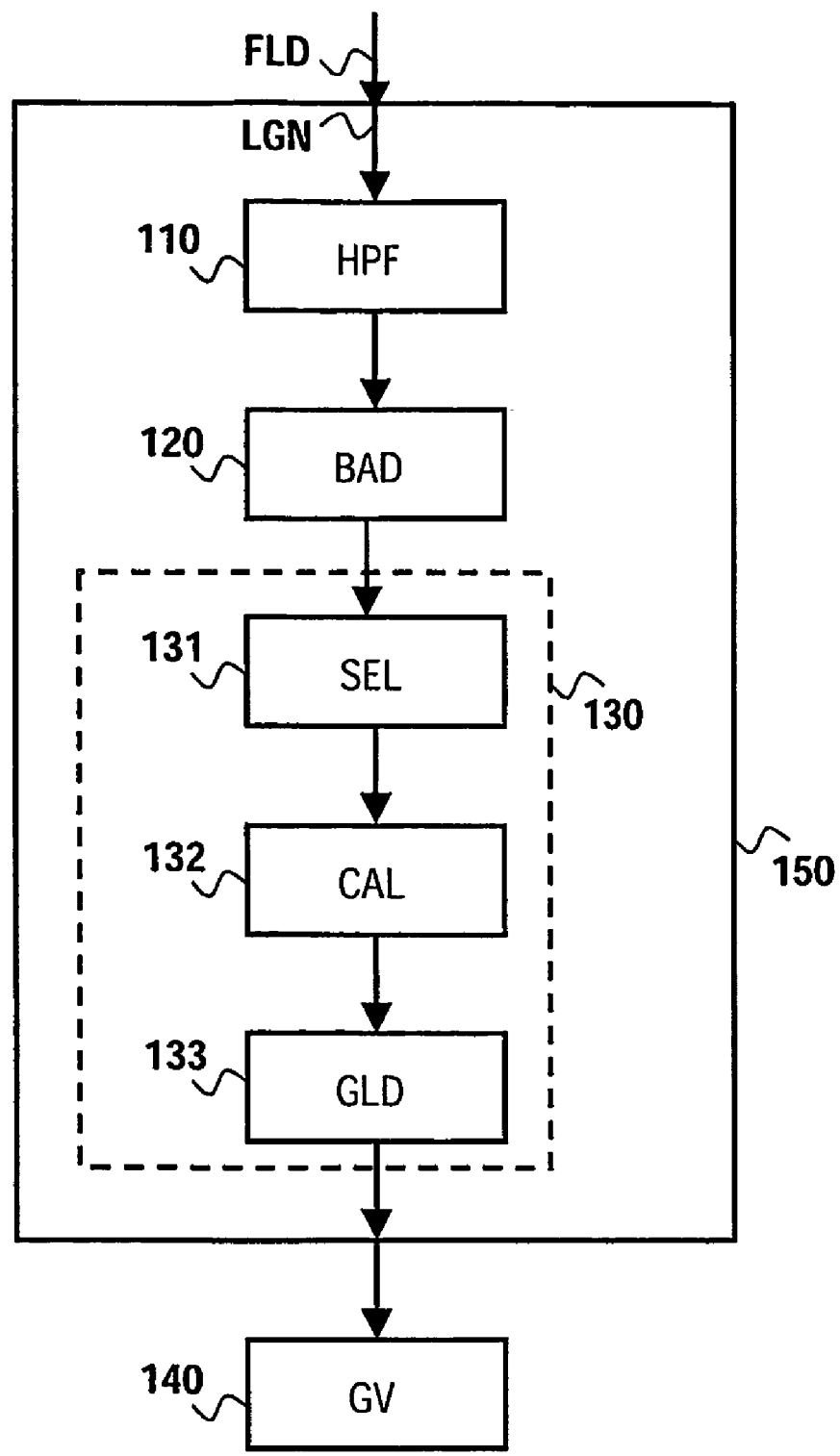
FIG. 1 is a diagram showing the data processing method according to the invention.

FIG. 1 shows diagrammatically the processing method according to the invention. Such a method first comprises a step of high-pass filtering HPF (110) a portion of a digital image. This portion is, for example, one of the two fields of a frame if the image is constituted by two interlaced frames. In the preferred embodiment, the high-pass filtering step is a gradient filtering step using the filter hp1=[1, −1, −4, 8, −4, −1, 1]. This filter is applied horizontally and vertically, row LGN by row, to pixels of luminance Y(m,n) of the field FLD of a digital image of the sequence, where m and n are integers between 1 and M and between 1 and N, respectively, corresponding to the position of the pixel in the field in accordance with a vertical and horizontal axis, respectively, (M=288 and N=720 in, for example, a 576×720 encoding format).

The result of this filtering operation is preferably constituted by two cards of discontinuity pixels, a horizontal card Eh and a vertical card Ev. As the majority of resampling operations is performed in the horizontal direction, the horizontal card Eh showing the vertical discontinuities may suffice in a first approximation. However, the processing method according to the invention will have an optimal efficiency when it is based on processing the two cards Eh and Ev of the discontinuity pixels.

Other gradient filters are possible such as, for example, the high-pass filter for the wavelet transform hp2= [0.045635882765054703, −0.028771763667464256, −0.2956358790397644, 0.5574351615905762, −0.2956358790397644, −0.028771763667464256, 0.045635882765054703] proposed by Antonini et al. in the article "Image Coding Using Wavelet Transform" IEEE Trans. Image Processing, vol. 1, no. 2, pp. 205-220, April 1992. Moreover, the high-pass filter hp1 can be implemented in a particularly simple way and yields results close to those of the filter hp2.

Figure 2:
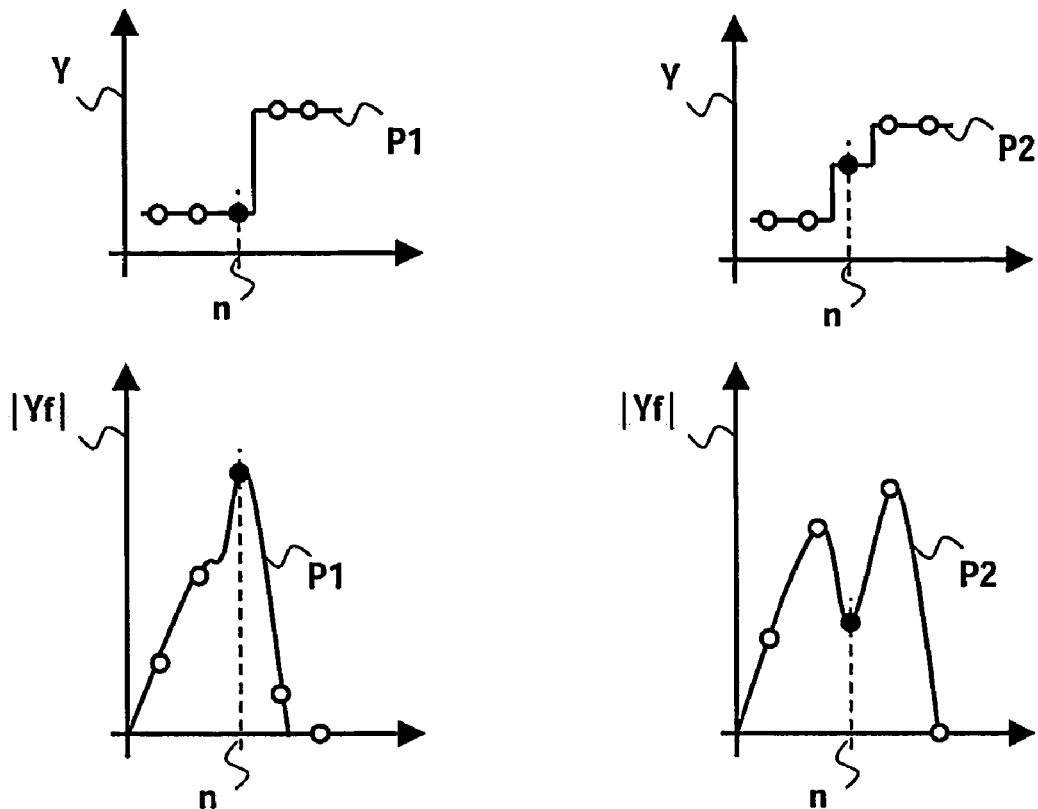
FIG. 2 illustrates two artefact profiles p1 and p2 which are principally encountered in images encoded in accordance with a block-based encoding technique, represented in the spatial domain and the frequential domain.

The method comprises a step of determining discontinuities corresponding to blocking artefacts BAD (120). Indeed, the discontinuities may correspond to blocking artefacts as well as to natural contours. The selection of pixels corresponding to blocking artefacts is performed as a function of the values of the filtered coefficients Yf corresponding to the discontinuity pixels, resulting in two binary cards of the probable position of the elementary blocking artefacts. FIG. 2 illustrates two artefact profiles p1 and p2 which are principally encountered in the images encoded in accordance with a block encoding technique, in the spatial domain as well as their representation in the frequency domain after filtering with the filter hp1 or hp2. The first profile p1 corresponds to a standard blocking artefact while the second profile p2 corresponds to a blocking artefact which is present in an image that has been submitted to a resampling operation or an equivalent processing operation. In the spatial domain, the first profile p1 is a simple step of a staircase, while the second profile p2 is a double step of a staircase. In the frequency domain, the first profile p1 is expressed by a peak whereas the second profile p2 is expressed by a double peak.

In the preferred embodiment, the step of determining discontinuities corresponding to blocking artefacts comprises a sub-step of detecting natural contours and non-visible artefacts. To this end, a coefficient value filtered horizontally $Yfh(m,n)$ and/or vertically $Yfv(m,n)$ must lie between two thresholds so as to be able to correspond to a blocking artefact. The first threshold S1 corresponds to a visibility threshold, whereas the second threshold corresponds to the limit from which the pixel of position (m,n) corresponds to a natural contour. The condition is preferably taken for the absolute value of coefficients filtered as follows:

$$S1 < |Yfh(m,n)| < S2 \text{ and } S1 < |Yfv(m,n)| < S2$$

As an alternative, the following condition is used:

$$S'1 < |Yfh(m,n)|^2 + |Yfv(m,n)|^2 < S'2$$

in which S'1 and S'2 have the same function as S1 and S2. The threshold values depend on the filter used. For the filter hp2, we take, for example, S'1=0.6 and S'2=400, S1=0.5 and S2=20. It may be particularly advantageous, in the case of MPEG-4 applications, where access to video data streams and thus to field quantization steps is possible, to vary the thresholds S1 to S2 as a function of said quantization step so as to further improve the efficiency of the processing method. For example, the threshold values are a linear function of the quantization step.

The step of determining discontinuities corresponding to blocking artefacts also comprises a sub-step of detecting blocking artefacts. A vertical artefact corresponding to the profile p1 is detected by scanning the vertical card Ev in accordance with a horizontal direction corresponding to the rbw m if the following condition is satisfied:

$$|Yfv(m,n)| > |Yfv(m,n+k)| \text{ with } k=-2,-1,+1,+2.$$

The border of the block is localized between the pixel of position (m,n) and that of the position (m, n+1) if $|Y(m,n)-Y(m,n-1)| < |Y(m,n)-Y(m,n+1)|$ and between the pixel of position (m,n−1) and that of position (m,n) in the opposite case.

An artefact corresponding to profile p2 is detected if the following cumulative conditions are satisfied:

$$f1 \cdot |Yfv(m,n)| < (|Yfv(m,n-1)| + |Yfv(m,n+1)|)$$

$$|Yfv(m,n-1)| > f2 \cdot |Yfv(m,n-2)|$$

$$|Yfv(m,n+1)| > f2 \cdot |Yfv(m,n+2)|$$

with f1=6 and f2=2 in the preferred embodiment.

The border of the block is localized between the pixel of position (m,n−1) and that of position (m,n). The detection of a horizontal artefact corresponding to each profile p1 and p2 is effected in a similar manner by scanning the horizontal card Eh comprising the coefficients $Yfh(m,n)$ filtered in a vertical direction corresponding to the column n.

In another embodiment which can easily be carried out, the high-pass filtering step is based on a gradient filtering operation using the filter hp3=[−1,1]. This type of filter provides the possibility of easily detecting blocking artefacts of the standard type corresponding to the profile p1. The step of determining discontinuities corresponding to blocking artefacts comprises a sub-step of detecting natural contours such as a natural contour which is detected when:

$$|Yfh(m,n)| < Sh \text{ and } |Yfv(m,n)| < Sv$$

with Sh=35 and Sv=50 for luminance values Y(m,n) varying between 0 and 255 in our example.

The step of determining discontinuities corresponding to blocking artefacts comprises a sub-step, effected on the filtered values Yfh and/or Yfv of pixels with the exception of natural contours, of detecting a blocking artefact which is detected when:

$$\begin{cases} |Yfh[i,j]| > |Yfh[i,j-1]| + \frac{|\overline{Yfh}|}{2} \\ |Yfh[i,j]| > |Yfh[i,j+1]| + \frac{|\overline{Yfh}|}{2} \end{cases}$$

$|\overline{Yfh}|$ being the average of the absolute value of Yfh in a field.

The processing method also comprises a step of searching (130) within the current field, rows of pixels having a high density of segments of elementary blocking artefacts as compared with neighboring rows.

This search step first comprises a selection sub-step SEL (131) intended to select segments in a horizontal or vertical row of the card of discontinuity pixels, which segments comprise a number of consecutive blocking artefacts Which is higher than a predetermined threshold S0. Indeed, the isolated discontinuities generally correspond to supplementary noise, while the blocking artefacts which are due to a coarse quantization of the DCT coefficients generally cause linear faults to appear along the encoding blocks. The value S0 of the predetermined threshold must not be too low so as not to favor the false detection. It must neither be too high so as not to constrain the selection too much by reducing the number of segments of detected elementary blocking artefacts. In practice, the value S0 is fixed at 3 for a field of 288 rows of 720 pixels.

The searching step also comprises a sub-step of computing CAL (132) a level $Nb_i$ of the blocking artefacts per row $L_i$, i being an integer corresponding to the number of the row in the field. In the preferred embodiment, the level of the blocking artefacts is obtained by counting the number of pixels associated with the segments of elementary artefacts present in a row. As an alternative, the level of blocking artefacts may be obtained by summing the values of the filtered coefficients Yf of the discontinuity pixels corresponding to the elementary artefacts of the selected segments in a row.

The searching step finally comprises a sub-step of determining GLD (133) the grid row, a row being detected by comparison with a set of neighboring rows.

In the case of the first profile p1, a row $L_i$ is determined as being a row of the grid based on a comparison of block artifact levels of a current row $L_i$, of the row which precedes immediately $L_{i-1}$, and of the row which follows immediately $L_{i+1}$, if:

$$Nb_i > \alpha(Nb_{i-1} + Nb_i + Nb_{i+1}) \text{ and } Nb_i > T1.N$$

wherein α is a coefficient which is equal, for example, to 2/3 for the detection of vertical rows, and to 3/5 for the detection of horizontal rows; T1 is a minimum percentage of artefacts in a row with which this row can be considered to belong to the grid, which percentage is taken to be equal to 10% in our example, and wherein N is the number of pixels per row, i.e. 720 in our example, so that the product T1.N is equal to 72.

In the case of the second profile p2, a row $L_i$ is determined as being a row of the grid based on a comparison of blocking artefact levels of a current row $L_i$ and of the rows which precede immediately $L_{i-1}$ and $L_{i-2}$ and follow immediately $L_{i+1}$ and $L_{i+2}$ if $$Nb_i > \beta(Nb_{i-2} + Nb_{i-1} + Nb_i + Nb_{i+1} + Nb_{i+2}) \text{ and } Nb_i > T2.N$$

wherein β is a coefficient which is equal to 2/3 in our example; T2 is a minimum-percentage of artefacts in a row, which is equal to 5% for the detection of vertical rows and 20% for the detection of horizontal rows. The condition $Nb_i > T2.N$ provides the possibility of controlling the reliability of the system. By increasing the value of T2, the risk of false detections is reduced.

The steps of the processing method described above are applied to the set of rows in a field (150). Subsequently, the processing method comprises a step of validation GV (140) intended to determine whether a number of rows of the grid is present within the field. This step takes place once the whole field has been investigated. The validation step ensures that no false detections of rows of the grid take place, notably for image sequences which have not been encoded and then decoded in accordance with a block-based encoding technique or which have been encoded in accordance with these techniques at high bit rates. Indeed, a false detection may take place if the number of rows of the grid found in the same field is very low. Thus, the validation step consists of comparing the total number Ntot of grid rows found in the field, this number Ntot being equal to the sum of the number of rows of the horizontal grid and the number of rows of the vertical grid with a predetermined threshold Stot. In our example, the number Ntot only totalizes rows of the grids corresponding to the profile p1; it is, however, possible to also take the rows of the grid corresponding to profile p2 into account by modifying the value of the threshold Stot. If the total number Ntot is higher than the threshold Stot, a grid is present in a field. The predetermined threshold Stot is a function of the horizontal and vertical dimensions H and V of the field by taking as a hypothesis that a maximum size of the grid is 16×16 pixels and at least a fraction, taken to be equal to one third in our example, of the grids must be detected for the detection to be valid, in other words:

$$Stot = (H+V)/(3 \times 16).$$

A first application of the data processing method according to the invention is constituted by post-processing images, intended to correct the blocking artefacts which are present in the rows of the grid. The correction depends on the profile of the detected blocking artefact. If the blocking artefact corresponds to profile pI, the correction described with reference to FIG. 3 is applied. The method of correcting blocking artefacts comprises the steps of:

computing a first discrete cosine transform DCT1 (31) of a first set of N data u, situated at the left or above the border of the block;

computing a second cosine discrete transform DCT1 (32) of a second set of N data v, situated at the right or below the border of the block and adjacent to the first set;

computing a global discrete cosine transform DCT2 (33) of a set of 2N data w corresponding to the concatenation CON (30) of the first and second sets and providing a set of transformed data W;

determining PRED (34) a predicted maximum frequency kwpred from the transformed data U and V obtained from the first (31) and second (32) transform DCT1, computed in the following manner:

$$kwpred = 2.\max(ku\max, kv\max) + 2$$

with $$ku\max = \max(ke\{0, \ldots, N-1\}/abs(U(k)) > T),$$

$$kv\max = \max(ke\{0, \ldots, N-1\}/abs(V(k)) > T),$$

where T is a threshold which is different from zero;

correcting ZER (35) by setting the odd transformed data W from the global discrete transform to zero, whose frequency is higher than the predicted maximum frequency, yielding corrected data W';

computing an inverse discrete cosine transform IDCT2 (36) of corrected data, yielding filtered data w' which are subsequently intended to be displayed on the screen.

If the blocking artefact corresponds to the profile p2, the correction must be modified considerably. Indeed, the position of the border of the block must be given more precisely because of the double step of the staircase corresponding to the profile p2, as illustrated in FIG. 4. To this end, the correction method preliminarily comprises a step of readjusting the luminance value of the intermediate pixel p(n) intended to give said luminance value the luminance value of the pixel which is situated directly on its right p(n+1). The previously described steps are then applied, in which the border of the block is present at the left of the intermediate pixel, which then forms part of the segment v. It is alternatively possible to choose the luminance value of the intermediate pixel to correspond to that of the pixel on the left, or to that of the pixel having the nearest luminance value. In both cases, the positioning of the segments u and v is adapted accordingly so as to apply the correction step.

A second application of the data processing method according to the invention is constituted by a device for measuring the block level of the field in order to determine the quality of the images. The result of this measurement, also referred to as metric measurement, is computed, for example, field by field by adding the levels of the blocking artefacts $Nb_i$ of the different rows of the grid.

It is possible to implement the processing method according to the invention by means of a television receiver circuit, said circuit being suitably programmed. A computer program stored in a programming memory may cause the circuit to perform the different operations described hereinbefore with reference to FIG. 1. The computer program may also be loaded into the programming memory for reading a data carrier such as, for example, a disc comprising said program. The reading operation may also be performed by means of a communication network such as, for example, the Internet. In this case, the service provider will put the computer program in the form of a downloadable signal at the disposal of those interested.

Any reference sign between parentheses in the present text should not be construed as being limitative. Use of the verb "comprise" and its conjugations does not exclude the presence of elements or steps other than those stated in the claims. Use of the article "a" or "an" preceding an element or step does not exclude the presence of a plurality of such elements or steps.

The invention claimed is:

1. A method of processing data corresponding to pixels of a sequence of digital images so as to detect a grid corresponding to blocking artifacts, comprising:
   high-pass filtering a portion of a digital image to supply at least one set of discontinuity pixels, detecting blocking artifacts from the at least one set of discontinuity pixels, and
   searching rows within the portion of the digital image for a grid row having a density of blocking artifacts that is substantially larger than that of its neighboring rows;
   wherein the searching includes:
   selecting, in a row of the portion of the digital image, segments comprising a number of consecutive blocking artifacts that is larger than a predetermined first threshold;
   computing a blocking artifact level, per row, on the basis of values of pixels of the selected segments; and
   determining the grid row based on a comparison of the blocking artifact levels of a current row and a set of neighboring rows.

2. The method of claim 1, including measuring image quality by adding the blocking artifact levels of the different rows of the grid for the portion of the digital image.

3. The method of claim 1, including validating to determine whether the grid is present within the portion of the digital image if the number of grid rows found in said portion of the digital image is higher than a second predetermined threshold.

4. The method of claim 1, wherein the high-pass filtering supplies two sets of discontinuity pixels, one horizontal set of discontinuity pixels and one vertical set of discontinuity pixels.

5. The method of claim 1, wherein detecting the blocking artifacts includes detecting a first type of blocking artifacts and a second type of blocking artifacts from the at least one set of discontinuity pixels.

6. The method of claim 5, including correcting the blocking artifacts situated in the grid rows in accordance with their type.

7. A computer-readable storage medium that includes a program product comprising a set of instructions which, when loaded into a circuit, cause said circuit to perform the method of processing digital images as claimed in claim 1.

8. A television receiver comprising: a screen that includes pixels arranged in rows, and a processing device that is configured to:
   high-pass filter a portion of a digital image to supply at least one set of discontinuity pixels, detect blocking artifacts from the at least One set of discontinuity pixels,
   search rows, within the portion of the digital image, for a grid row having a density of blocking artifacts that is substantially larger than that of its neighboring rows,
   select, in a row of the portion of the digital image, segments comprising a number of consecutive blocking artifacts that are larger than a predetermined first threshold;
   compute a blocking artifact level, per row, based on values of pixels of the selected segments;
   and determine the grid row based on a comparison of the blocking artifact levels of a current row and a set of neighboring rows;
   correct the blocking artifacts situated in the grid row to provide a corrected digital image, and display corrected digital images on the screen.

9. The receiver of claim 8, wherein the processing device is configured to detect a first type of blocking artifact and a second type of blocking artifact from the at least one set of discontinuity pixels.

10. The receiver of claim 9, wherein the processing device is configured to correct the blocking artifacts situated in the grid rows based on the type of blocking artifact.

11. The receiver of claim 8, including a validation system that is configured to validate a presence of the grid row by comparing a total number of grid rows found to a threshold value.

12. The receiver of claim 8, wherein the processing device includes:
   a plurality of discrete cosine transforms that are arranged to identify one or more frequency limits associated with the grid row, and a correction unit that is configured to substantially reduce elements of the digital image that exceed these one or more frequency limits to form the corrected digital image.

13. A display system comprising:
   a display screen that includes pixels arranged in rows,
   a high-pass filter that is configured to filter a portion of a digital image to supply at least one set of discontinuity pixels,
   a detector that is configured to search rows within the portion of the digital image, for a grid row having a density of blocking artifacts that is substantially larger than that of its' neighboring rows, and wherein the detector is configured to:
   select, in a row of the portion of the digital image, segments comprising a number of consecutive blocking artifacts that is larger than a predetermined first threshold;
   compute a blocking artifact level per row based on values of pixels of the selected segments;
   and determine the grid row based on a comparison of the blocking artifact levels of a current row and a set of neighboring rows;
   and a correction system that is configured to correct the blocking artifacts situated in the grid row to provide a corrected digital image for display on the display screen.

14. The system of claim 13, including a validation system that is configured to validate a presence of the grid row by comparing a total number of grid rows found to a threshold value.

15. The system of claim 13, wherein the correction system includes:

a plurality of discrete cosine transforms that are arranged to identify one or more frequency limits associated with the grid row, and a correction unit that is configured to substantially reduce elements of the digital image that exceed these one or more frequency limits to form the corrected digital image.

16. The system of claim 15, wherein the correction unit includes:

a filter that is configured to substantially eliminate components of an output of at least one of the discrete cosine transforms corresponding to frequencies above the one or more frequency limits to form a filtered transform, and an inverse discrete cosine transform that is configured to convert the filtered transform into at least a portion of the corrected digital image.

* * * * *